Aug. 12, 1941.     F. HAUSER     2,252,125
VALVE CONTROL SYSTEM
Filed May 16, 1939     5 Sheets-Sheet 1

Inventor
FRED HAUSER,
By C. A. Mikella
Attorney

Aug. 12, 1941.     F. HAUSER     2,252,125
VALVE CONTROL SYSTEM
Filed May 16, 1939     5 Sheets-Sheet 2

Inventor
FRED HAUSER,
By
Attorney

Aug. 12, 1941.   F. HAUSER   2,252,125
VALVE CONTROL SYSTEM
Filed May 16, 1939   5 Sheets-Sheet 5

Inventor
FRED HAUSER,
By
Attorney

Patented Aug. 12, 1941

2,252,125

UNITED STATES PATENT OFFICE 2,252,125

VALVE CONTROL SYSTEM

Fred Hauser, Culver City, Calif.

Application May 16, 1939, Serial No. 274,069

16 Claims. (Cl. 161—7)

This invention pertains to improvements in systems for sequential operation of service valves and is particularly directed to improvements and devices whereby valves controlling fluids under pressure may be sequentially operated from a remote point. Systems of this general type are most often used in the operation of sprinklers on golf courses, in parks, orchards, residences, etc., and one of the objects of the present invention is to provide control means whereby the hydraulic pressure existing in the water mains may be utilized for the purpose of energizing a motor means, which motor means then causes the sequential operation of service valves. By the term "service valves," reference is made to valves which control branch lines or banks of sprinklers whereas the control head is a device which causes sequential operation of the service valves.

Heretofore sprinkling systems have been evolved attempting to provide means for sequentially controlling service valves but in such prior means motors were required and extraneous sources of energy had to be supplied in order to drive the controlling devices. The present invention distinguishes from these prior attempts in that it employs the pressure existing in the water mains for the purpose of storing energy and in energizing a motor means whereby sequential operation of service valves may be attained without extraneous or added power and without the complexities attendant the supply of energy or the more delicate mechanisms utilizing the same.

Generally stated, the present invention pertains to a system including a control head, such control head including an hydraulic means for energizing a spring motor. This hydraulic means can be actuated from any remote control point for the purpose of resetting or rewinding the motor means and thereby initiating a sequential operation of service valves. Moreover, the arrangement of elements hereinafter disclosed permits manual operation of individual service valves in the event such manual operation is desired. In addition, the arrangement of elements permits the removal or elimination of the hydraulic resetting or presetting means in the event elimination of this element is desired for purposes of economy or simplicity of installation.

An object of the present invention, therefore, is to disclose and provide a system for sequential operation of service valves.

A further object is to provide a combination of elements whereby means controlling the operation of service valves may be reset or energized by hydraulic means from a remote point.

A still further object is to provide means whereby a plurality of service valves may be controlled and actuated in a simple and efficient manner by the expenditure of but minimum amounts of power.

These and other objects, uses, advantages, adaptations and modifications of the invention will become apparent to those skilled in the art from the following detailed description of an illustrative embodiment of the invention. In order to facilitate understanding, reference will be had to the appended drawings, in which:

Figures 1, 2, 5, 6:
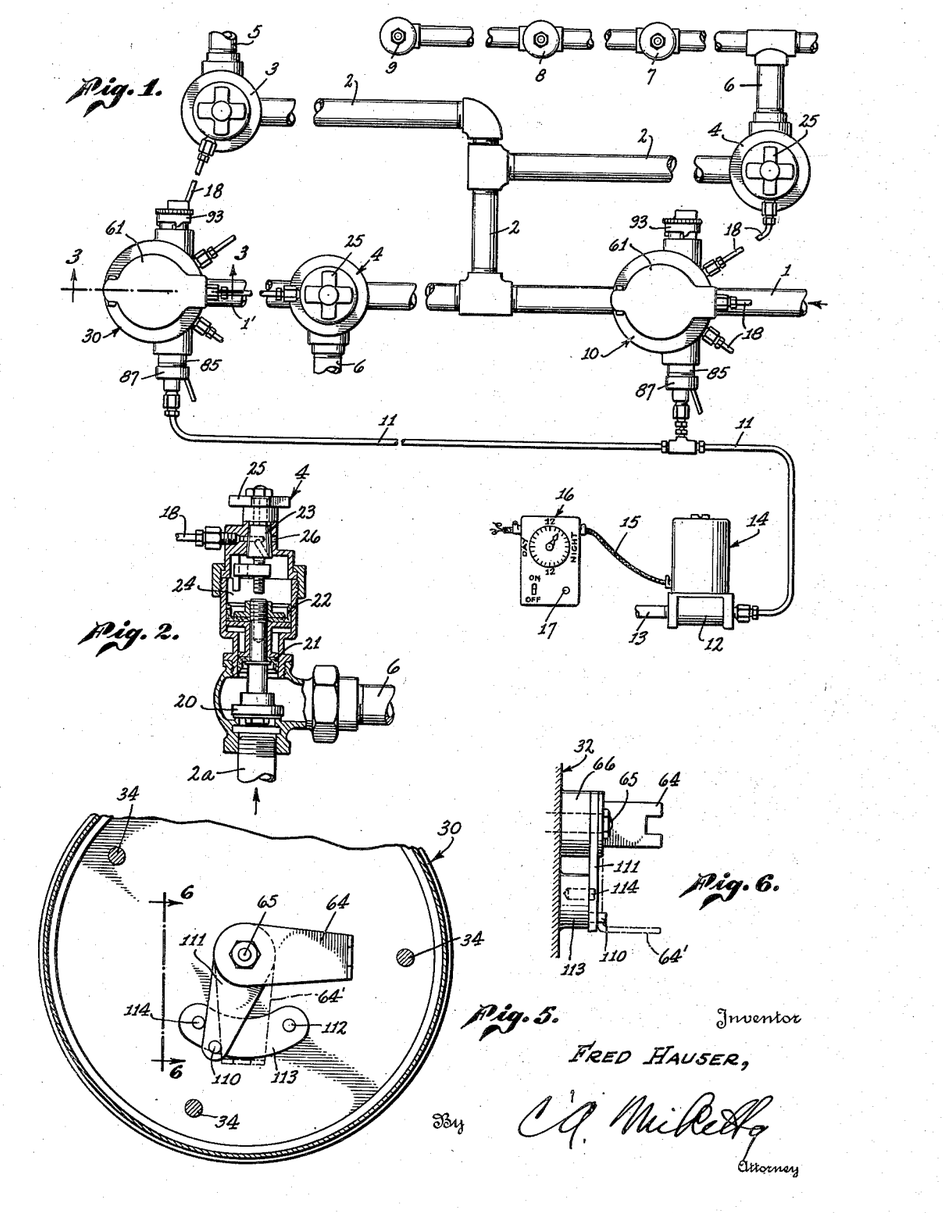
Fig. 1 is a plan view, diagrammatic in general form, of a system of branch lines provided with control heads and service valves.
Fig. 2 is a vertical section partly broken away of a service valve.
Fig. 5 is a horizontal section taken along the plane 5—5 of Fig. 3.
Fig. 6 is a side elevation of a portion of Fig. 5, said side elevation being taken from the plane 6—6 of Fig. 5.

As shown in Fig. 1, a fluid pressure line, such as the water main 1, may be provided with a branch line 2 leading to service valves 3 and 4 which control the supply of pressure fluid or water to branch lines 5 and 6, the branch lines 5 and 6 being provided with sprinklers or outlets 7, 8, 9, etc. A control head is indicated at 10 and the bottom of this control head is connected to the pressure line 1. The control head 10 may be connected as by means of tubing 11 with a valve 12, said valve connecting the tubing 11 with a pressure line 13 leading back to the main 1 or some other suitable source of pressure. The valve 12 may be operated by means of a solenoid or electromagnetic device generally indicated at 14, such electromagnetic device or solenoid being associated as by means of a cable 15 with a time clock, generally indicated at 16. Such time clock may include or may be supplanted by a simple contact switch 17 capable of energizing the solenoid or electromagnet 14 to open the valve 12 and connect the tubing 11 with the pressure line 13.

It is to be understood that each control head 10 may be associated with a plurality of service valves 4 by means of suitable conduits or tubes, such as the tube 18. The service valve 4 is shown in more detail in Fig. 2. Attention is called to the fact that a service valve of the character shown in the drawings is described in detail in my co-pending application Serial No. 218,524.

The service valve 4 illustrated in Fig. 2 is simply illustrative of one form of valve which may be employed, it being understood that other types of service valves may be used instead.

Generally stated, however, the service valve 4 shown in the drawings is of the differential pressure hydraulic type and includes a valve member 20 provided with a small piston including the cup leather 21 and a larger piston including the cup leather 22. The tubing 18 supplies pressure fluid from the control head through a rotatable valve body 23 into the chamber 24, such pressure fluid thereby acting upon the large end of the movable valve body and upon the large piston 22, thereby forcing the valve body 20 upon its seat so as to cut off the supply of pressure fluid from the branch inlet 2a to the outlet line 6. Manual rotation of the valve body 23, as for example by means of the element 25 (adapted to be engaged by the usual type of tools) may cut off the supply of pressure fluid to the service valve and discharge the pressure fluid within the chamber 24 through an outlet 26, thereby permitting the valve body 20 to be raised and water from manifold 2a supplied to the branch 6.

The control head is shown in detail in Figs. 3 to 14 inclusive. By referring to Fig. 3, it will be seen that the control head includes three main sections. An upper section is indicated at 30 and contains a motor means such as, for example, a spring clock motor 31. Beneath the section 30 is a section 32 adapted to contain an hydraulic means for energizing the motor 31. The bottom section, generally indicated at 33, includes the control valves. The three sections 30, 32 and 33 may be held together in any suitable manner as, for example, by means of tie bolts such as 34. The circumferential edges of the various sections may be provided with stepped joints to facilitate interlocking as indicated, for example, at 35, such construction also permitting the removal of the intermediate section 32, if desired, the upper section 30 then interlocking directly with the bottom section 33.

Figures 3, 4:
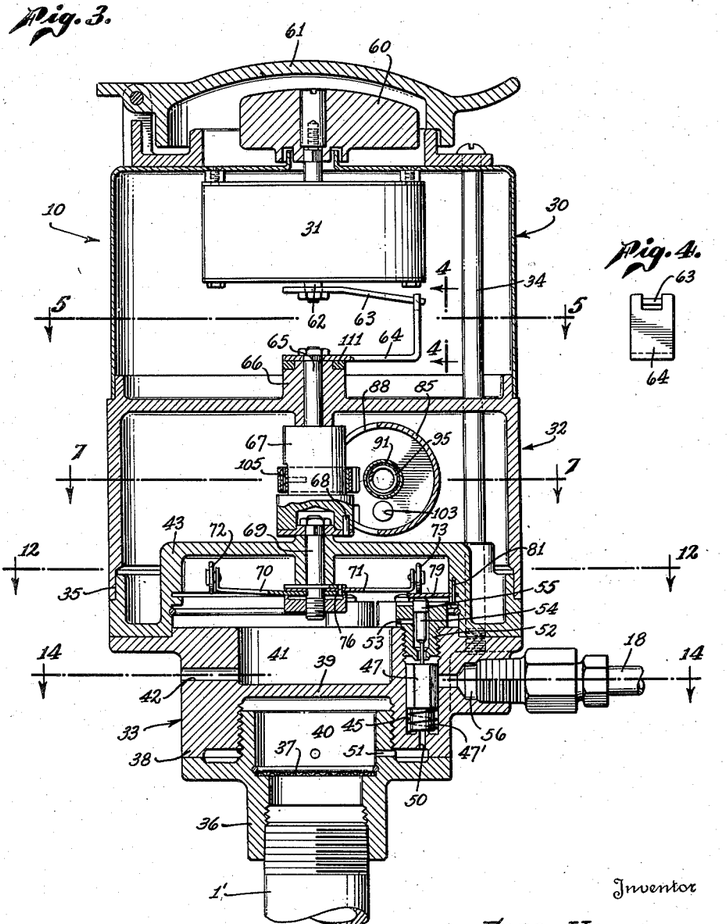
Fig. 3 is a vertical section taken along the plane 3—3 of Fig. 1 and illustrating the construction of a control head.
Fig. 4 is a side elevation taken along the plane 4—4 of but a portion of the control head shown in Fig. 3.

The bottom section 33 may be made from a number of pieces in order to facilitate assembly. It may, for example, include a coupling 36 by means of which the control head may be connected to the main line 1'. The coupling 36 may include a filter screen 37 and be threadedly connected to a body member 38 having a partition 39 therein forming a pressure chamber 40. The chamber 41 formed on the other side of the partition 39 may connect with the atmosphere through a bleeder outlet 42. This lowermost section 33 may also be provided with a capping plate 43.

Figure 14:
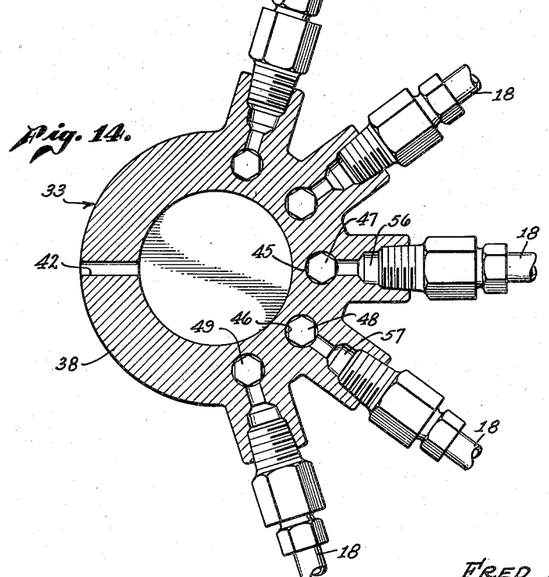
Fig. 14 is a horizontal section taken along the plane 14—14 of Fig. 3.

The body member 38 is shown in Figs. 3 and 14 and includes a plurality of vertical bores 45, 46, etc., adapted to receive valve members 47, 48, etc. These valve members may comprise bodies of non-metallic material such as, for example, vulcanized rubber, having a polygonal cross section and preferably including a stepped portion or portion of reduced diameter as, for example, the portion 47' (Fig. 3). Each of the bores, such as the bore 45, is provided with an axial port 50 in communication with the pressure chamber 40 as by means of the port 51 formed in the gland or connection 36. The upper end of each bore 45, 46, etc., is provided with a removable threadedly connected valve seat plug 52 having a port axial to the bore 45 and a transverse outlet port 53 leading to the bleeder chamber 41. Loosely movable within the valve seat plug 52 is a pin 54 provided with a head 55 extending from the plug.

Radially directed from the body member 38 are ports 56, 57, etc., these ports leading to the various bores 45, 46, etc. The various ports 56, 57 are then connected as by means of tubing 18 with service valves such as the service valve 4. As shown in Fig. 14, five service valves are associated with the five control valves carried by the body member 38.

At this point attention is called to the fact that when fluid under pressure is admitted to the chamber 40 from the main 1', such fluid under pressure will pass through the port 51 into the axial port 50 and into the bore 45. In view of the fact that the control valve 47 has a lower section 47' of reduced diameter, the valve 47 will be raised and seated against the axial part of the valve seat plug 52. Such upward movement may be somewhat facilitated by means of a light spring carried around the reduced section of the valve 47. Fluid under pressure will flow past the valve 47 into the radial port 56 associated therewith and through the tubing 18 to the service valve 4. In such service valve the fluid under pressure will move the differential piston assembly downwardly so as to seat the valve 20 and thereby prevent the flow of fluid from the pipe 2a into the branch line 6. Ordinarily, all of the various control valves 48 are in raised position and are seated against the axial ports of the valve seat plugs 52. In such position, all of the service valves 4 are closed and the head 55 on the pin member 54 is protruding above the valve seat plugs 52.

It is to be remembered that it is desired to sequentially operate the various service valves. In order to accomplish this, the motor 31 may be wound by hand as, for example, by means of a key 60 extending from the top of the housing section 30 and protected from the elements by means of a pivoted cover plate 61 mounted on the top of the housing section 30. The main drive shaft 62 of the motor 31 may be provided with the arm 63, the end thereof being received in an upstanding bifurcated portion of a crank arm 64 attached to one end of a shaft 65 journaled in a boss 66 formed in the central housing section 32. The shaft 65 may be provided with a section of enlarged diameter 67, which section may be removably connected to the shaft 65. Such section 67 may then be removably connected as by means of a pin 68 to a shaft 69 journaled in the top cover plate 43 of the lower section 33. The shaft 69 may carry means whereby the control valves are operated. For example, the shaft 69 may carry the arms 70 and 71, these arms being provided at their outer ends with rollers 72 and 73. The arms 70 and 71 may be placed in any desired angular relation in that one of said arms such as, for example, the arm 70 (Fig. 13) is provided with a plurality of circumferentially spaced perforations or notches 74, 75, etc., a desired perforation or notch being engaged by a pin 76 which extends through the arm 71 and thereby holds the two arms in fixed relation.

The cover plate 43 of the bottom section carries a plurality of cover plates such as the cover plates 77, 78 and 79 loosely connected to the inner walls of the cover plate 43 as by means of pins 80, 81, etc., whereby these cover plates 77, 78, etc., may move up and down over the upstanding heads 55 of the pin rods 54 carried in the valve seat plugs 52. One of the cover plates is positioned above each of the valve seat plugs and the rollers 72 and 73 of the arms 70 and 71 are adapted to ride over the cover plates 77 and 78 and cause said cover plates to depress the pins 54, which pins extend through the axial ports of the valve seat plugs 52 and are adapted to force the valve bodies 48 downwardly so as to seat such valve bodies on the valve ports 50 leading to the pressure chamber 40. When a control valve 48 is in such depressed position (illustrated in Fig. 3), then the pressure fluid from the service valve 4 and conduit 18 may be discharged through port 57 into the bore 46 and out through the valve plug 52 and port 53 into the bleeder chamber 41 and to the atmosphere through the bleeder outlet 42.

It will be noted that the various cover plates 77, 78, have their edges closely adjacent, thereby permitting the wheels or discs 72 and 73 to travel easily from one cover plate to another, pressure being imparted by a cover plate to the pin immediately therebeneath as long as the wheel or disc rests on the upper surface of such cover plate.

Rotation of the shaft 69 and its valve actuating arms 70 and 71 may be imparted by means of the motor 31. In order to obviate the necessity of manually winding the motors 31 whenever it is desired to place them in operation, hydraulic means are provided for rewinding or energizing the motors 31 from a remote point. Such hydraulic means are best shown in Figs. 3 and 7 to 11. Such hydraulic means may comprise a cylinder 85 extending through the side walls of the middle section 32 and removably held therein as, for example, by means of a dog set screw 86. One end of the cylinder may be capped as indicated at 87 and provided with a connection to the line 11 which leads to valve 12 and the source of fluid pressure 13. The cylinder 85 may be provided with an opening or port indicated at 88 adjacent the extension shaft 67. Slidably mounted within the cylinder 85 is a piston 89 connected to a cross-head 90 in any suitable manner. In the drawings the connection is indicated as consisting of a tube 91. The cross-head may be prevented from rotating within the cylinder 85 by means of a pin 91' carried by the cross-head and extending into a longitudinal slot 92 formed in the wall of the cylinder 85. The other end of the cylinder 85 may be provided with a timing head 93 threadedly mounted on the protruding end of the cylinder 85. This timing head may carry an axial guide pin 94 adapted to extend into the tube 91 connecting the piston 89 and the cross-head 90 and functioning to guide a spring 95 which tends to force the piston 89 toward the closed or pressure end of the cylinder 85.

The timing head 93 also carries two adjustably positionable stop pins 97 and 98 differing in length, the stop pin 98 (shown in Fig. 8) being shorter. Dogs 100 and 101 are formed in the skirt of the timing head 93, such dogs cooperating with a fixed stop 102. When the timing head is in the position shown in Fig. 7, motion of the piston and cross-head upwardly will be stopped by the pin 97. If, however, the timing head 93 is partly rotated so as to cause the dog 101 to engage with the stop 102 (Fig. 9) then the stop pin 97 will be placed in such position that it can pass through an aperture 103 formed in the cross-head and thereby permit such cross-head to move upwardly until it is stopped by pin 98 (see Fig. 8).

A length of resilient material such as, for example, a length of spring metal, is attached by one end to the cross-head as, for example, by wrapping the spring 105 around a pin 106 carried by the cross-head 90. The other end of the spring 105 is attached in any suitable manner to the extension shaft 67. It will be evident, therefore, that in the event the piston 89 is forced to move within the cylinder 28, the cross-head 90 will also move and such movement will unwind the spring or cable 105 from the extension shaft 67, causing such extension shaft 67 to rotate. This counterclockwise rotation of the extension shaft 67 would be transmitted by shaft 65 and crank arm 64 to the lever 63 carried upon the main drive shaft 62 of the motor 31, thereby energizing said motor and immediately initiating clockwise movement of the extension shaft 67 under the influence of the motor 31. The piston 89 would return to its original starting position (Fig. 7) under the influence of the spring 95, pressure fluid being discharged from the cylinder 85 through the bleeder outlet 87'. The counterclockwise rotation of shaft 67 would also be transmitted to shaft 69 and valve actuating arms 70 and 71.

Figures 12, 13:
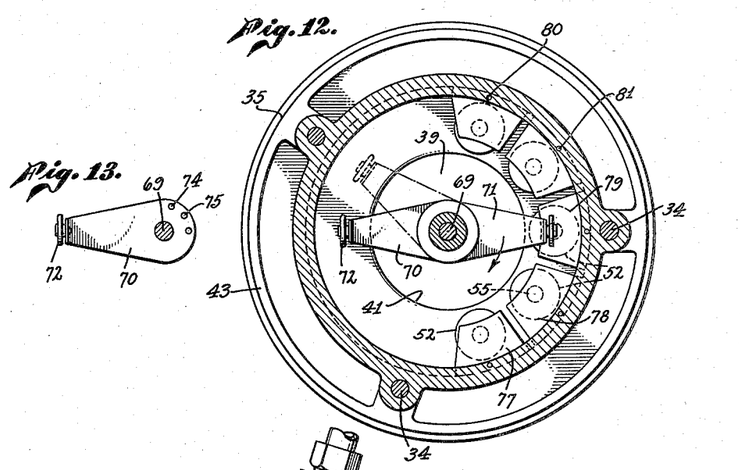
Fig. 12 is a horizontal section taken along the plane 12—12 of Fig. 3.
Fig. 13 is a plan view of a valve operating means shown in Fig. 12.

The rotatable elements or arms 70 and 71 and the dogs or discs carried thereby sequentially operate the control valves and thereby cause operation of the service valves. The speed of rotation of these arms 70 and 71 determines the length of time which each service valve is held open. This speed of rotation is dependent upon the gearing of the motor 31. In the event the arms 70 and 71 were diametrically related, then in the arrangement shown in Fig. 12 the five control valves would be sequentially operated over and over again, first by arm 71 and then by arm 70 as long as the shaft 69 was driven by the motor 31. In actual practice, the dogs or discs carried by the rotatable elements (arms 70 and 71) maintain each control valve in its depressed position for a period of about five minutes. In the event the arms 70 and 71 were to start in an up and down position (see Fig. 12)

and would describe a complete revolution, then each service valve would be opened twice, each open period being approximately five minutes long with one minute intermission between adjacent valves. With arm 71 positioned as shown in Fig. 12 and with arm 70 in the dotted position, there would be two sprinkling cycles to each service valve, the second cycle starting approximately twenty-four minutes after the conclusion of the first. In the event the device is so arranged that the arms perform two revolutions, then four sprinkling cycles would occur. Repeated sprinkling is thus obtained and such repeat sprinkling is desirable when the slope of the ground precludes very prolonged continuous sprinkling without excessive run-off, since the ground is given time to absorb the moisture between cycles.

In order to prevent the motor 31 from continuing to drive the valve controlling arms 70 and 71 for unnecessarily long periods of time, means are provided for stopping said arms after they have completed the desired number of revolutions, or fraction of one. The crank arm 64 is mounted on the shaft 65 which is interlocked with the shaft 69 carrying the arms 70 and 71. In its normal position at rest, the crank arm 64 will occupy a position which on Fig. 5 will be straight down, i. e., a six o'clock position. The arm 64 in Fig. 6 is shown in full lines as at about three o'clock and since such arm is moving in a clockwise direction, it has completed three-quarters of its revolution. The arm 64 will continue to move under the influence of the driving motor until it reaches the position indicated in dotted lines 64' at which point the crank arm 64 will be stopped by the pin 110 carried by a movable pin arm 111 pivotally mounted upon the boss 66. The pin arm 111 can either assume the position indicated in full lines in Fig. 5 or it can rock to such position that its right edge abuts the stop 112 of the boss 113. As shown in Fig. 5, the pin arm 111 is abutting the stop 114 carried by the boss 113. When, therefore, the motor means are rewound either by hand or by the action of the hydraulic energizing means previously described, the crank arm 64 will move from the position 64' in a counterclockwise direction until its edge abuts the pin 110 and moves the pin arm 111 into contact with the stop 112 whereupon a complete revolution would have been performed by the crank arm 64. If more than one revolution of arm 64 is desired, stop pin 112 may be placed in another position.

When the timing head 93 forms a part of the complete unit, then the stop 97 of the timing head permits the crank arm 64 to perform only for a half revolution, the crank arm then moving from position 64' to an up and down position (twelve on a dial), this being the extent to which the single action driving connection between the cross-head 90 and the shaft 67 will rotate the shaft 65 and the crank arm 64. Cylinder 85 may also be made of different length as desired to permit crank arm 64 to make more than one revolution.

Attention is called to the fact that the connection between the reciprocating member 90 and the shaft 67 is effective in imparting power in driving the shaft 67 only in one direction and is therefore called a single acting drive.

Figures 7, 8, 9, 10, 11:
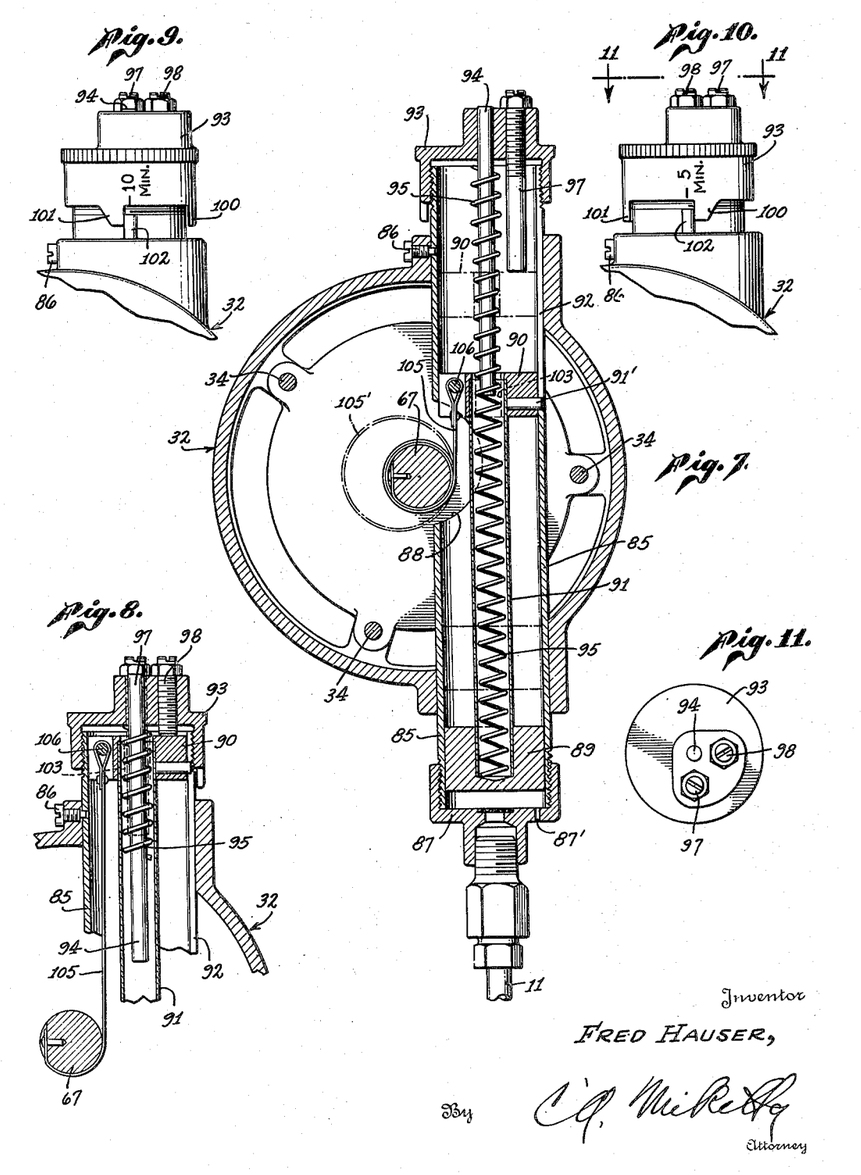
Fig. 7 is a horizontal section taken along the plane 7—7 of Fig. 3 and showing the hydraulic means for energizing the motor.
Fig. 8 is a portion of the hydraulic means shown in Fig. 7 at the end of an energizing stroke.
Fig. 9 is a plan view showing the exterior arrangement of a timing head carried by the hydraulic means.
Fig. 10 is an exterior view of the timing head in a different position.
Fig. 11 is an end view of Fig. 10.

By referring to Fig. 7 which shows the position of the elements just at the start of a driving movement, the spring 105 is wound tightly around the shaft 67. As soon as the supply of pressure fluid to the cylinder has ceased, the spring 95 will force the reciprocating member back to its down position, the pressure fluid being discharged through the outlet 87'. The spring 105 will then assume a loose position as indicated by dotted lines 105'.

Figure 16:
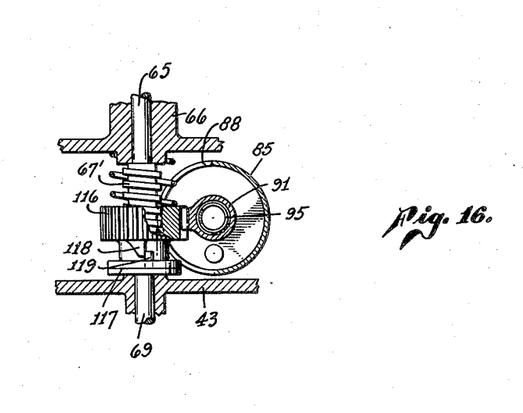
Fig. 16 is a fragmentary section of the control head showing a modified form of energizing means.

Instead of employing a spring or flexible cable as the single acting drive between the reciprocating member and the shaft 67, other forms of connection may be employed. For example, as shown in Fig. 16 the tubular connecting member 91 may be provided with a rack gear 115 capable of engaging a pinion 116. The shafts 65 and 69 may be coupled together as by the coupling 117 and the enlarged portion 67 may now be in the form of a steeply pitched spiral 67'. The pinion 116 is internally threaded upon the spiral 67'. The pinion 116 is also provided with a dog 118 cooperating with a lug 119 extending from the shaft portion 67' or from the coupling member 117. In operation, when the hydraulic energizing means is actuated the rack 115 being in engagement with the pinion 116 will cause the dog 118 to engage the lug 119 and rotate the shafts 69 and 65 in a counterclockwise direction. When the rack 115 has executed its return stroke, however, the pinion 116 will move loosely on the spiral 67' without imparting any rotation to the shafts 65 and 69.

If it should be desired to use only four (or less) valves instead of all five as shown, one valve seat plug 52 would be replaced by a stop plug and corresponding port 56 also would be plugged. Arm 70 which is provided with a plurality of circumferentially spaced perforations, would then be positioned in such a manner that the included angle formed by arms 70 and 71 would include four (or less) instead of five control valves (as shown in Fig. 13).

Figure 15:
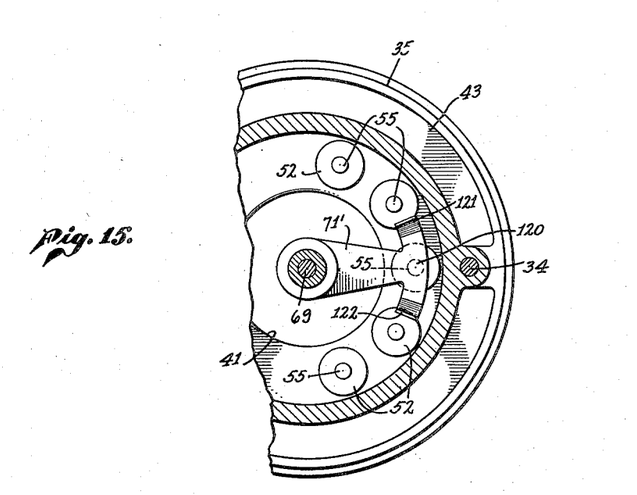
Fig. 15 is a plan view of a modified form of valve operating means.

Although in the embodiment shown in detail in the various drawings little cover plates 77, 78, etc., have been shown above the heads 55 of the pin members 54, such cover plates need not be employed in the event the arms 70 and 71 are provided with dogs of the character shown in Fig. 15. As shown in Fig. 15, the arm 71' may be provided at its outer end with a shoe 120 having upwardly curved end portions 121 and 122. The shoe 120 may therefore contact the upstanding heads 55 directly and hold such heads down so as to keep the axial ports open for a desired length of time.

It will be understood that in a complete system of piping, valves and controls, one or more control heads may be used, depending upon the diameter of the pressure fluid mains, the number of service valves carried by the branches thereof and the volume of fluid which it is desired to pass through each of such service valves. Moreover, the control heads need not include the hydraulic energizing means contained within the housing section 32 although such hydraulic energizing means greatly facilitate the operation of the devices. The pressure fluid supplied to the hydraulic energizing means may be supplied from any suitable source and the valve 12 may be located at any desired place in the conduit supplying such pressure fluid. The remote control means, such as the time clock 16, may include contacts capable of energizing and operating the valve 12 at predetermined times. The manual push button 17 may be used whenever it is desired to place the control heads in operation manually, and no time clock 16 may be employed.

Those skilled in the art will further understand that the hydraulic energizing means may be employed in control heads differing materially from the one specifically illustrated herein. All such changes, modifications and adaptations as come within the scope of the appended claims are embraced thereby.

I claim:

1. In a system for sequential operation of service valves: a control head comprising three sections removably connected together and including an upper section containing a motor means, a lower section including an hydraulic means for energizing said motor means, and a bottom section including a pressure chamber, a bleeder chamber, a plurality of service ports, and a control valve associated with each of said service ports and adapted to selectively connect said ports with either said pressure chamber or bleeder chamber, continuously movable valve operating means carried within the bottom section, a driving connection between said valve operating means and motor means, and a service valve connected to each of said ports, each of said service valves being adapted to open when connected to the bleeder chamber and to close when connected to the pressure chamber, said valve operating means being adapted to sequentially move said control valves to connect ports associated therewith with the bleeder outlet and thereby sequentially open said service valves, said control valves automatically acting to connect the pressure chamber with the service valves and close the same when said valve operating means is not acting on said control valves.

2. In a system for sequential operation of service valves: a control head comprising three substantially cylindrical sections removably connected together and including an upper section containing a motor means, a lower section including an hydraulic means for energizing said motor means, and a bottom section including a pressure chamber, a bleeder chamber, a plurality of radially extending service ports, and a control valve associated with each of said service ports and adapted to selectively connect said ports with either said pressure chamber or bleeder chamber, valve operating means carried within the bottom section, a driving connection between said valve operating means and motor means, a remote control means for supplying pressure fluid to said hydraulic energizing means; and a service valve connected to each of said ports, each of said service valves being adapted to open when connected to the bleeder chamber and to close when connected to the pressure chamber, said valve operating means being adapted to move within predetermined limits to sequentially move said control valves to connect ports associated therewith with the bleeder outlet and thereby sequentially open said service valves, said control valves automatically acting to connect the pressure chamber with the service valves and close the same when said valve operating means is not acting on said control valves.

3. A control head for sequential operation of service valves comprising: a body portion provided with a partition dividing the same into a pressure chamber and a bleeder chamber; a plurality of parallel bores in said body portion, a valve inlet communicating one end of each of said bores with the pressure chamber, a valve outlet communicating the opposite end of each bore with the bleeder chamber, a service outlet in communication with each of said bores between each of said valve inlets and outlets; a movable valve member in each of said bores, means for normally maintaining said valve members seated on said valve outlets, pin means extending through each of said valve outlets into contact with said valve members; and driven valve actuating means for sequentially moving said pin means to unseat the valve members from said valve outlets and to simultaneously close the valve inlets.

4. A control head for sequential operation of service valves comprising: a substantially cylindrical body portion provided with a transverse partition dividing the same into a pressure chamber and a bleeder chamber; a plurality of circularly arranged, parallel bores in said body portion, a valve inlet communicating one end of each of said bores with the pressure chamber, a valve outlet communicating the opposite end of each bore with the bleeder chamber, a radially extending service outlet in communication with each of said bores between each of said valve inlets and outlets; a movable valve member in each of said bores, movable pin means extending through each of said valve outlets into contact with said valve members, means for normally maintaining said valve members seated on said valve outlets; a cover plate hingedly connected to said body portion above each of said pin means; and a rotatable valve actuating means adapted to travel over said cover plates and sequentially move said pin means to unseat the valve members from said valve outlets and to simultaneously close the valve inlets.

5. In a sprinkling system, a control head including an approximately cylindrical body portion provided with a transverse partition dividing the same into a pressure chamber and a bleeder chamber, a plurality of circularly arranged, parallel bores in said body portion, a valve inlet communicating one end of each bore with the pressure chamber, a valve outlet communicating the opposite end of each bore with the bleeder chamber, a radially extending service outlet in communication with each of said bores between each of said valve inlets and outlets; a service valve connected to each of said service outlets, a movable valve member having a longitudinally channelled surface in each of said bores, means for normally maintaining said valve member seated on its valve outlet, movable pin means extending through each of said valve outlets into contact with said valve members, and driven valve actuating means for sequentially moving said pin means to unseat the valve members from said valve outlets and thereby sequentially connect said service valves with said bleeder chamber.

6. A control head for sequential operation of service valves comprising: a virtually cylindrical body portion provided with a transverse partition dividing the same into a pressure chamber and a bleeder chamber; a plurality of circularly arranged, parallel bores in said body portion, a valve inlet communicating one end of each of said bores with the pressure chamber, a valve outlet communicating the opposite end of each bore with the bleeder chamber, a service outlet in communication with each of said bores between each of said valve inlets and outlets; a movable valve member in each of said bores, means for normally maintaining said valve members seated on said valve outlets, pin means extending through each of said valve outlets into contact with said valve members; rotatable valve actuating means for sequentially moving said pin means to unseat the valve members from said valve outlets, and to simultaneously close the valve inlets, motor means for imparting continuous rotation to said valve actuating means, means for limiting the rotation of said valve actuating means, and an hydraulic means for energizing said motor means.

7. In a device of the character described, the combination of: a control head including a spring motor means, a rotatable member, and a driving connection between said motor means and rotatable member, a series of pilot valves adapted to be actuated by said rotatable member; an hydraulic winding means for energizing said motor means, said winding means including a cylinder, a reciprocable element in said cylinder, a single acting drive between said reciprocable element and driving connection, a fluid pressure conduit connected to said cylinder, a valve in said conduit, and means located at a point removed from said control head for actuating said valve to supply pressure fluid to said cylinder to move said reciprocable element and wind said motor means.

8. In a device of the character described, the combination of: a control head including a spring motor means, a rotatable member, a driving connection between said motor means and rotatable member, a series of pilot valves adapted to be actuated by said rotatable member; an hydraulic winding means for energizing said motor means, said winding means including a cylinder, a reciprocable element in said cylinder, manually adjustable stop means for limiting the action of said reciprocable element, a single acting drive between said reciprocable element and driving connection, a fluid pressure conduit connected to said cylinder, a valve in said conduit, and means located at a point removed from said control head for actuating said valve to supply pressure fluid to said cylinder to move said reciprocable element and wind said motor means.

9. A control head comprising a casing including a spring motor means and an hydraulic means for winding said motor means, said hydraulic winding means including a cylinder, a reciprocable element in said cylinder, a single acting drive between said reciprocable element and motor means; a fluid pressure conduit connected to said cylinder, a valve in said conduit, and means located at a point removed from said control head for actuating said valve to supply pressure fluid to said cylinder to move said reciprocable element and wind said motor means.

10. A control head comprising a casing including a spring motor means and an hydraulic means for winding said motor means, said hydraulic winding means including a cylinder, a reciprocable element in said cylinder, manually adjustable stop means for limiting the action of said reciprocable element, a single acting drive between said reciprocable element and motor means; a fluid pressure conduit connected to said cylinder, a valve in said conduit, and means located at a point removed from said control head for actuating said valve to supply pressure fluid to said cylinder to move said reciprocable element and wind said motor means.

11. In a system for sequential operation of service valves, the combination of: a control head including a spring motor means, hydraulic means for energizing said motor means, a pressure chamber, a bleeder chamber, and a plurality of service ports; a service valve connected to each of said ports, each service valve being in a pressure line; a plurality of control valves in said control head, one of said control valves being associated with each of said service ports and adapted to selectively connect said service ports with either said pressure chamber or bleeder chamber, whereby said service valves will open when connected with the bleeder chamber and close when connected to the pressure chamber; rotatable valve operating means adapted to sequentially operate said control valves, means for limiting the rotation of said valve operating means, a driving connection between said valve operating means and motor means, and a remote control for actuating said hydraulic means to initiate a sequence of operations.

12. In a system for sequential operation of service valves: a control head comprising three sections removably connected together and including an upper section containing a motor means, a lower section including an hydraulic means for energizing said motor means, and a virtually cylindrical lower section having a body portion provided with a transverse partition dividing the same into a pressure chamber and a bleeder chamber; a plurality of circularly arranged bores having parallel axes in said body portion, a valve inlet communicating one end of each of the bores with the pressure chamber, a plug having a valve outlet removably held in the other end of each bore, said valve outlets communicating said bores with the bleeder chamber, a movable valve member of polygonal section in each bore, means for normally maintaining said valve members seated on said valve outlets, movable pin means carried by each plug and extending through said valve outlets into contact with said valve members; a radially extending service outlet in communication with each of said bores between each of said valve inlets and outlets, a service valve connected to each of said service outlets, each of said service valves being adapted to open when connected to the bleeder chamber and to close when connected to the pressure chamber; a rotatable member axially positioned with respect to said body portion, adjustably positionable arms carried by said member, said arms being adapted to depress said pin means and unseat said valve members from said valve outlets sequentially, and to simultaneously close the valve inlet, stop means limiting the movement of said arms; a driving connection between said motor and said rotatable member, and a remote controlled means for operating said hydraulic motor energizing means whereby said rotatable member and arms are reset into initial starting position and the energized motor means initiates a sequence of valve operations.

13. A control head for sequential operation of service valves comprising: a virtually cylindrical body portion provided with a transverse partition dividing the same into a pressure chamber and a bleeder chamber; a plurality of circularly arranged, parallel bores in said body portion, a valve inlet communicating one end of each of said bores with the pressure chamber, a valve outlet communicating the opposite end of each bore with the bleeder chamber, a service outlet in communication with each of said bores between each of said valve inlets and outlets; a movable valve member in each of said bores, means for normally maintaining said valve members seated on said valve outlets, pin means extending through each of said valve outlets into contact with said valve members; a rotatable valve actuating means for sequentially moving said pin means to unseat the valve members from said valve outlets and to simultaneously close the valve inlets, a spring motor for imparting rotation to said valve actuating means; and an hydraulic means for energizing said motor means, said hydraulic means including a cylinder, a reciprocable element in said cylinder, a single acting drive between said reciprocable element and motor means for winding the same, a fluid pressure conduit connected to said cylinder, and means located at a point removed from said control head for admitting pressure fluid into said pressure conduit to supply pressure fluid to said cylinder to move said reciprocable element and wind said motor means, whereby the rotatable valve actuating means sequentially operates the valve members for a cycle.

14. A control head for sequential operation of service valves comprising: a virtually cylindrical body portion provided with a transverse partition dividing the same into a pressure chamber and a bleeder chamber; a plurality of circularly arranged, parallel bores in said body portion, a valve inlet communicating one end of each of said bores with the pressure chamber, a valve outlet communicating the opposite end of each bore with the bleeder chamber, a service outlet in communication with each of said bores between each of said valve inlets and outlets; a movable valve member in each of said bores, means for normally maintaining said valve members seated on said valve outlets, pin means extending through each of said valve outlets into contact with said valve members; a rotatable valve actuating means for sequentially moving said pin means to unseat the valve members from said valve outlets and to simultaneously close the valve inlets, a spring motor for imparting rotation to said valve actuating means; and an hydraulic means for energizing said motor means, said hydraulic means including a cylinder, a reciprocable element in said cylinder, timing means including manually adjustable stops for limiting the action of said reciprocable element, a single acting drive between said reciprocable element and motor means for winding the same, a fluid pressure conduit connected to said cylinder, and means located at a point removed from said control head for admitting pressure fluid into said pressure conduit to supply pressure fluid to said cylinder to move said reciprocable element and wind said motor means, whereby the rotatable valve actuating means sequentially operates the valve members for a repeat operation determined by selective adjustment of the timing means.

15. A control head for sequential operation of service valves comprising: a virtually cylindrical body portion provided with a transverse partition dividing the same into a pressure chamber and a bleeder chamber; a plurality of circularly arranged parallel bores in said body portion, a valve inlet communicating one end of each of said bores with the pressure chamber, a valve outlet communicating the opposite end of each bore with the bleeder chamber, a service outlet in communication with each of said bores between each of said valve inlets and outlets; a movable valve member of polygonal section in each bore, spring means within each bore and around a reduced portion of each valve member for normally maintaining said valve members seated on said valve outlets, pin means extending through each of said valve outlets into contact with said valve members; a rotatable valve actuating means for sequentially moving said pin means to unseat the valve members from said valve outlets and simultaneously close the valve inlets, a spring motor for imparting rotation to said valve actuating means; and an hydraulic means for energizing said motor means, said hydraulic means including a cylinder, a reciprocable element in said cylinder, a single acting drive between said reciprocable element and motor means for winding the same, a fluid pressure conduit connected to said cylinder, and means located at a point removed from said control head for admitting pressure fluid into said pressure conduit to supply pressure fluid to said cylinder to move said reciprocable element and wind said motor means, whereby the rotatable valve actuating means sequentially operates the valve members for a cycle.

16. In a system for sequential operation of service valves: a water main, a control head connected to the water main, a plurality of service valves connected to the main, a control pipe leading from each service valve to the control head, a rotary member arranged for operation within said control head for sequentially relieving the pressure on the service valves through their connections to said control head so that said service valves may open sequentially and permit water from the main to flow through said service valves, said control head including a motor means, a driving connection between said motor means and said rotary member, and an hydraulic winding means for winding said motor means, said winding means including a cylinder, a reciprocable element in said cylinder, and a single acting drive between said reciprocal element and driving connection; a fluid pressure conduit connected to said cylinder, a valve in said conduit, and means located at a point removed from said control head for actuating said valve to supply pressure fluid to said cylinder to move said reciprocable element and wind said motor means.

FRED HAUSER.